United States Patent [19]

Bryant et al.

[11] Patent Number: 5,669,582
[45] Date of Patent: Sep. 23, 1997

[54] METHOD AND APPARATUS FOR REDUCING UNWANTED SIDEWAYS MOTION IN THE AFT CABIN AND ROLL-YAW UPSETS OF AN AIRPLANE DUE TO ATMOSPHERIC TURBULENCE AND WIND GUSTS

[75] Inventors: William F. Bryant, Bellevue; Arun A. Nadkarni, Kirkland; Paul Salo, Seattle, all of Wash.

[73] Assignee: The Boeing Company, Seattle, Wash.

[21] Appl. No.: 440,339

[22] Filed: May 12, 1995

[51] Int. Cl.$^6$ .................................. B64C 13/16
[52] U.S. Cl. ...................... 244/76 C; 244/184; 244/195
[58] Field of Search .................. 244/76 C, 194, 244/195, 184

[56] References Cited

U.S. PATENT DOCUMENTS

| | | | |
|---|---|---|---|
| 5,072,893 | 12/1991 | Chakravarty et al. | 244/194 |
| 5,135,186 | 8/1992 | Ako | 244/195 |
| 5,186,416 | 2/1993 | Fabre et al. | 244/76 C |
| 5,375,794 | 12/1994 | Bleeg | 244/76 C |
| 5,458,304 | 10/1995 | Gilbert | 244/184 |
| 5,549,260 | 8/1996 | Reed, III | 244/195 |
| 5,588,620 | 12/1996 | Gilbert | 244/194 |

*Primary Examiner*—Andres Kashnikow
*Assistant Examiner*—Virna Lissi Mojica
*Attorney, Agent, or Firm*—Christensen, O'Connor, Johnson & Kindness PLLC

[57] ABSTRACT

A method and apparatus for reducing the unwanted sideways motion of an airplane by reducing the lateral side loads and upsets caused by atmospheric turbulence and gusts is disclosed. A rudder modification command that causes the rudder command of the airplane to be changed in a manner that relieves the net force across the vertical stabilizer of the airplane caused by atmospheric turbulence and gusts is produced. More specifically, the pressure differential across opposite sides of the vertical stabilizer is measured and used to produce a rudder deflection value that is roll rate and yaw rate compensated. The compensated deflection value is high-pass filtered with a corner frequency that is twenty-five percent (25%) of the Dutch roll frequency of the airplane. The result is a first rudder deflection value that is subtractively combined with a second rudder deflection value. The second rudder deflection value is derived by gain adjusting and low-pass filtering the inertial sideslip angle rate value produced by the airplane's yaw damper. The low-pass filter has a corner frequency that is also twenty-five percent (25%) of the Dutch roll frequency of the airplane. The combined rudder deflection value is modified by a steady sideslip gain value and filtered by a gain shaping filter. The gain shaping filter increases the gain above the Dutch roll frequency of the airplane. The resultant rudder modification command is subtractively combined with the yaw damper rudder command to produce a rudder command. Preferably, a flow separation monitor is included to prevent the rudder modification command from producing a rudder command that exceeds allowable structural limits. Also, preferably, the rudder modification command is used to produce a lateral control command that is used to suppress rigid body roll response and improve handling qualities by gain adjusting and low-pass filtering the rudder modification command.

39 Claims, 2 Drawing Sheets

METHOD AND APPARATUS FOR REDUCING UNWANTED SIDEWAYS MOTION IN THE AFT CABIN AND ROLL-YAW UPSETS OF AN AIRPLANE DUE TO ATMOSPHERIC TURBULENCE AND WIND GUSTS

TECHNICAL AREA

The invention relates to airplane control systems and, more particularly, to airplane rudder control systems.

BACKGROUND OF THE INVENTION

When flying in discrete wind gusts and atmospheric turbulence, the aft portion of the cabin of commercial and other transport airplanes experiences higher levels of lateral acceleration than do the forward and middle portions of the cabin. The increased level of lateral acceleration is not only uncomfortable from a passenger ride quality standpoint, but it can also create a difficult work environment for cabin crews of commercial jet airplanes, since the galley of many such airplanes is located in the aft cabin. The higher aft cabin lateral acceleration in response to discrete wind gusts and atmospheric turbulence of commercial jet airplanes is due to the rigid body weathercock stability and the flexible body bending of the fuselage of such airplanes. The principal cause of the higher aft cabin lateral acceleration is the lateral force produced by the lateral component of wind gusts and atmospheric turbulence impinging on the vertical stabilizer of the airplane. As is well known to those skilled in the art, aft body lateral acceleration can be significantly reduced by reducing or countering the effect of the vertical stabilizer of an airplane in wind gusts and atmospheric turbulence.

In the past, conventional modal suppression systems have been developed to reduce the effect of atmospheric turbulence and wind gusts in the aft cabin of commercial jet airplanes. Modal suppression systems employ lateral accelerometers to sense lateral side loads. The sensed information is used to generate rudder commands designed to attenuate the flexible body response to atmospheric turbulence and wind gusts. The signals produced by modal suppression systems are filtered to remove components of the signals lying outside of the flexible bending mode frequencies of the body (fuselage) of the airplane, namely the first body bending mode frequency, which lies between 2 and 4 Hz. Because modal suppression systems add damping to body oscillations after discrete wind gusts or atmospheric turbulence have excited the body to start such oscillations, modal suppression systems actually attenuate motion due to flexible coupling, rather than act to prevent such motion.

Recently, a method and apparatus has been developed for reducing undesired airplane aft cabin sideways motion resulting from atmospheric turbulence and wind gusts that uses a vertical stabilizer differential pressure sensor to produce a signal that is used to move the rudder on the vertical stabilizer in a direction that relieves vertical stabilizer loads. See U.S. Pat. No. 5,375,794, titled "Apparatus and Method for Reducing Aircraft Loads Resulting From Atmospheric Turbulence and Gusts" by Robert J. Bleeg (hereinafter '794 patent), the subject matter of which is incorporated herein by reference. The method and apparatus described in the '794 patent produces a rudder command that has been filtered to respond to wind gusts and air turbulence at and above the Dutch roll frequency range of an airplane. The filter has a corner frequency, $f_c$, equal to 1 rad/sec. This corner frequency was selected to achieve the best balance between providing wind gust and atmospheric turbulence vertical stabilizer lead alleviation and retaining good airplane handling qualities.

While the method and apparatus described in the '794 patent is a substantial improvement over modal suppression systems, it is subject to improvement, particularly when used in a fly-by-wire airplane control system. The present invention is directed to providing such improvements.

SUMMARY OF THE INVENTION

In accordance with the present invention, a method and apparatus for reducing the unwanted sideways motion of the aft cabin of an airplane by relieving the lateral directional loads and upsets on the vertical stabilizer of the airplane caused by atmospheric turbulence and wind gusts is provided. In accordance with the invention, a rudder modification command that modifies the rudder command of the airplane in a manner that relieves the net force across the vertical stabilizer of the airplane caused by atmospheric turbulence and wind gusts is produced. The rudder modification command is ideally suitable for use by a fly-by-wire control system to modify rudder command signals. Alternatively, the rudder modification command can also be used by other types of airplane rudder control systems to modify rudder position commands in a manner that relieves the net force across the vertical stabilizer of the airplane caused by atmospheric turbulence and wind gusts.

In accordance with other aspects of this invention, the pressure differential across opposite sides of the vertical stabilizer, preferably at the ten percent (10%) chord, is measured. The pressure differential data is used to produce a rudder deflection value that is roll and yaw rate compensated. The compensated rudder deflection value is high-pass filtered by a filter having a corner frequency, $f_c$, that is twenty-five percent (25%) of the Dutch roll frequency of the airplane. The high-pass filter provides full gain at and above the Dutch roll frequency, while reducing the gain for lower frequency disturbances. This reduces the rigid body response of the airplane to gusts and turbulence in the Dutch roll frequency range for optimum gust suppression performance, but restores full airplane weathercock stability for low-frequency windshears. The high-pass filtered result is a first rudder deflection value that is subtractively combined with a second rudder deflection value. The second rudder deflection value is derived by gain adjusting and low-pass filtering the inertial sideslip angle rate value produced by the airplane's yaw damper. The low-pass filter corner frequency is aligned with the high-pass filter corner frequency at twenty-five percent (25%) of the Dutch roll frequency of the airplane. The magnitude of the combined rudder deflection values is filtered by a gain shaping filter. The gain shaping filter increases the gain for frequencies above the Dutch roll frequency of the airplane, reaching a maximum gain increase of seventy percent (70%) at approximately four (4) times the Dutch roll frequency. The net effect of the gain shaping filter is to cancel approximately fifty percent (50%) of the vertical stabilizer load for frequencies between $f_c$ and $\omega_1$ (0.25 to 2.5 times the Dutch roll frequency) and cancel almost all (85%) of the vertical stabilizer load above $\omega_2$ (4 times the Dutch roll frequency). The result is a rudder command modification value that, when subtractively combined with the yaw damper rudder command, produces a rudder command that will reduce unwanted sideways motion in the aft cabin of an airplane.

In accordance with further aspects of this invention, prior to being filtered by the gain shaping filter, the combined rudder deflection value is gain adjusted by a steady sideslip static gain value.

In accordance with still further aspects of this invention, preferably, a flow separation monitor is included to monitor the first rudder deflection value and prevent a rudder command modification value from being generated that could produce a rudder command that exceeds allowable structural limits when combined with the yaw damper rudder command.

In accordance with still further principles of this invention, preferably, the rudder command modification value is used to generate a gust suppression lateral control command by gain adjusting and low-pass filtering the rudder command modification value. The lateral control command, in combination with the rudder modification command, reduces unwanted roll upsets in response to discrete gusts and turbulence, and thereby improves airplane handling qualities, as well as ride quality.

As will be readily appreciated from the foregoing summary, the invention provides a method and apparatus for producing a rudder control command that substantially reduces the left-right aft cabin lurching that exists when a conventional yaw damper alone is used to control rudder position, when an airplane is flying in discrete wind gusts or atmospheric turbulence that create a lateral load on the vertical stabilizer of the airplane. Minimizing the rigid body yaw rate response to wind gusts and atmospheric turbulence also improves airplane performance. The use of this invention results in approximately equal lateral acceleration intensity occurring at the pilot seat, center of gravity, and the aft body of the airplane. Reducing the aft cabin rigid body displacement improves passenger ride quality and the working environment in the rear (galley) area of the airplane. Reducing the roll and yaw axes response to wind gusts and atmospheric turbulence also improves airplane handling quality and flight path control, thereby reducing pilot workload. Rudder and wheel commands are both more effective in systems that incorporate this invention because vertical stabilizer differential pressure is used to prevent motion, as compared to prior systems that used inertial sensors to attenuate uncommanded motion or path variations, rather than preventing upsets resulting from atmospheric turbulence and wind gusts.

BRIEF DESCRIPTION OF THE DRAWINGS

The foregoing features and aspects of the present invention will become more readily appreciated as the same becomes better understood by reference to the following detailed description of a preferred embodiment of the invention, when taken in conjunction with the accompanying drawings, wherein.

DETAILED DESCRIPTION OF THE PREFERRED EMBODIMENT

As will be better understood from the following description, while the invention was designed for use in a "fly-by-wire" airplane control system, and is described in connection with such a system, it is to be understood the invention can be incorporated in other types of airplane control systems, if desired. Further, as is conventional, while the invention is illustrated and described in the form of a control law containing discrete blocks designed to accomplish specific functions, it is to be understood that the invention can be actually implemented in various ways. For example, the various functions of the illustrated control law can be carded out by a suitably programmed digital computer system. Alternatively, the functions can be carried out by digital or analog circuits.

Figure 1:
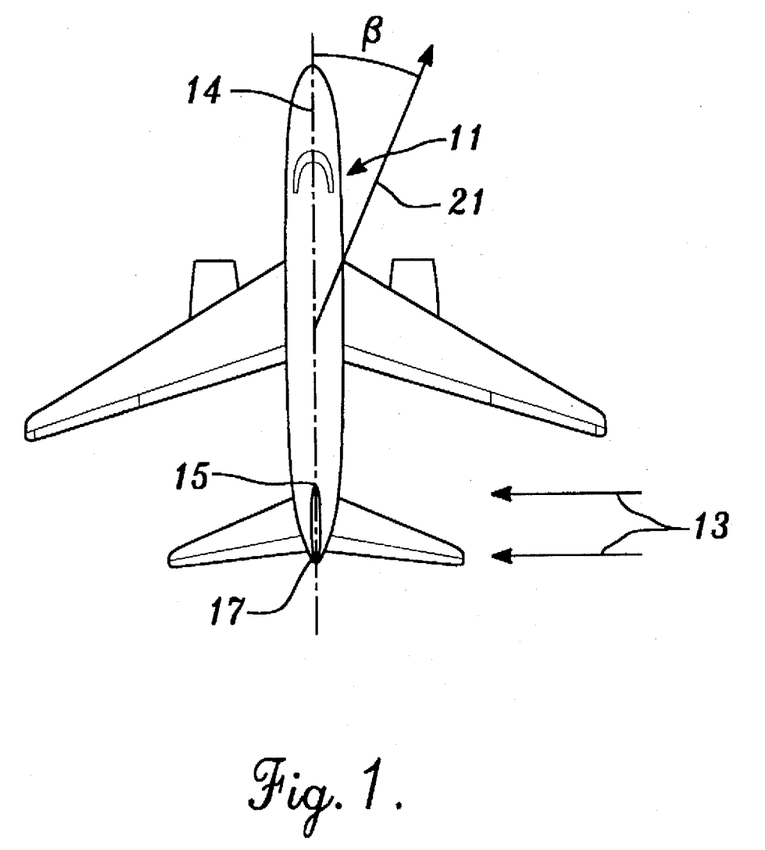
FIG. 1 is a plan view of a conventional commercial jet transport airplane.

FIG. 1 illustrates a conventional commercial jet transport airplane 11, which includes a vertical stabilizer 15. The vertical stabilizer includes a rudder 17. When flying, the airplane 11 may be subject to wind gusts and atmospheric turbulence, which generate side load (lateral) forces. As shown by arrows 13, the vertical stabilizer 15 receives a substantial portion of the lateral forces produced by wind gusts and atmospheric turbulence.

As explained in the '794 patent, more fully referenced above and incorporated herein by reference, if the relatively high frequency components of the lateral forces 13 that impact the vertical stabilizer 15 of an airplane are "removed," the total lateral acceleration at the aft bulkhead of the airplane is reduced by eighty percent (80%). Removal can be accomplished by movement of the rudder 17 in a relieving direction in response to a wind gust or atmospheric turbulence. The relieving direction is the direction that decreases the lift generated by the vertical stabilizer. For example, if a side gust is applied to the airplane in a right-to-left direction (when viewing FIG. 1), movement of the trailing edge of the rudder 17 by a proper amount to the left, i.e., the relieving direction, counteracts the side load, reducing the net force acting on the vertical stabilizer.

By definition, the aircraft sideslip angle beta ($\beta$), shown in FIG. 1, is the angle between the longitudinal axis of the airplane 14 and the direction of flight of the airplane, shown by arrow 21. As noted in the '794 patent, moving the rudder of a conventional transport jet airplane approximately two degrees in the relieving direction for every degree of sideslip angle $\beta$ results in no net side force acting on the vertical stabilizer 15.

The total side force on the vertical stabilizer 15 is a function of chordwise and spanwise pressure distribution. For a conventional sideslip angle, the maximum pressure differential occurs somewhat ahead of the ten percent (10%) chord position of the vertical stabilizer. Pressure changes in response to rudder deflections, which are centered around the rudder hinge line at about the seventy percent (70%) chord location, have little effect at the ten percent (10%) chord location.

Figure 2:
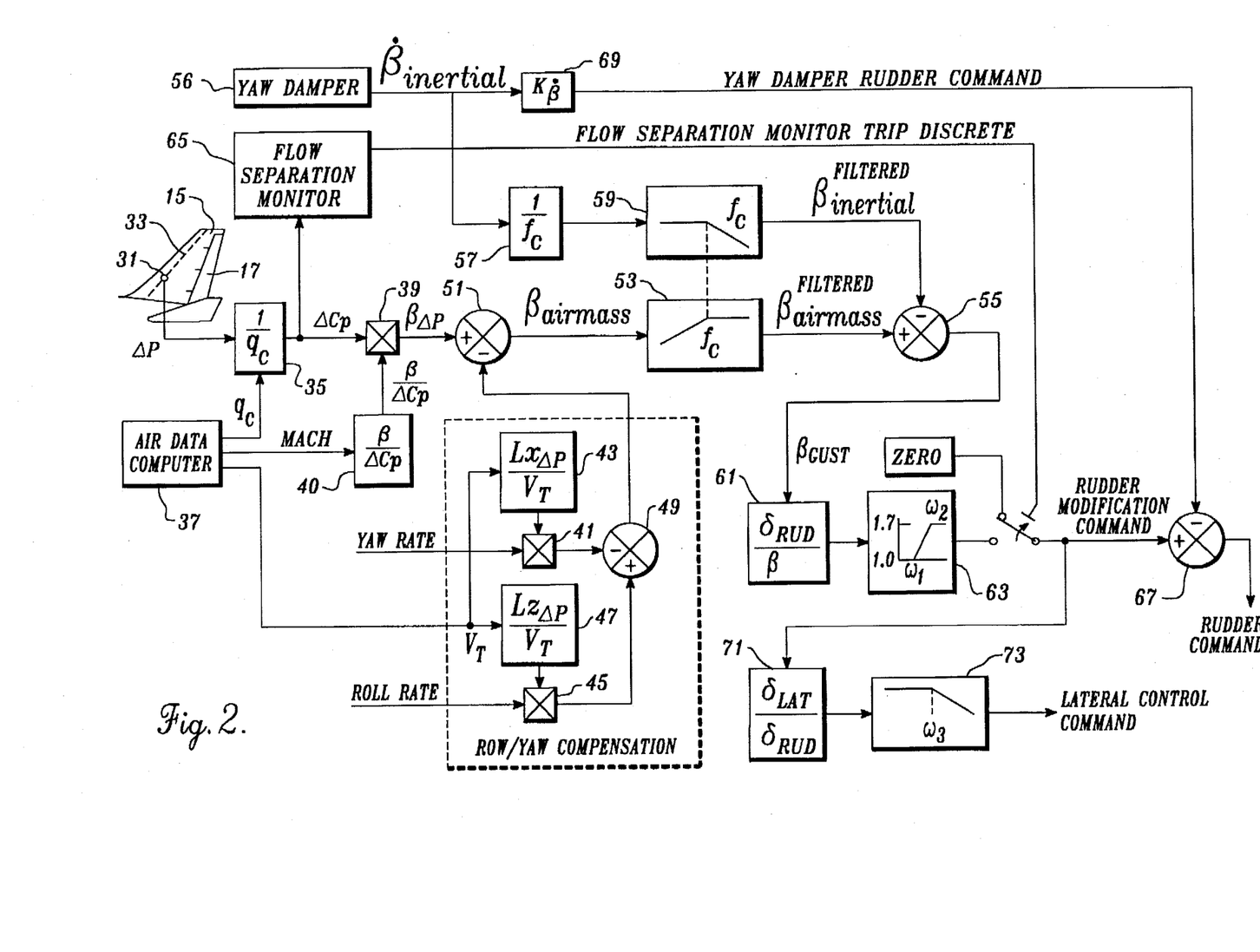
FIG. 2 is a control law diagram of the presently preferred embodiment of the invention.

As shown in FIG. 2, in accordance with the present invention, a conventional differential pressure sensor 31 is installed at approximately the ten percent (10%) chord line 33 of the vertical stabilizer 15 to sense the pressure differential across the vertical stabilizer at this location. The differential pressure sensor is positioned sufficiently above the fuselage intersection to minimize fuselage interference and wing tip vortex effects. Preferably two differential sensors 31 are installed on the vertical stabilizer approximately three (3) feet apart. The outputs of the two sensors are compared against each other to provide protection against sensor failures. As the rudder 17 is moved in the relieving direction, there is little change in the pressure differential at the ten percent (10%) chord location. This provides for accurate implementation of the present invention, since corrective movement of the rudder does not significantly affect the pressure differential being sensed.

As will be better understood from the following description, the present invention modifies the data produced by the differential pressure sensor 31 in a variety of ways that results in the production of a rudder modification command that, when incorporated into a rudder command, results in the rudder of the airplane moving in a direction that counteracts the side loads that produce the differential pressure sensed by the differential pressure sensor 31.

The differential pressure data produced by the differential pressure sensor 31, denoted ΔP, is first gain compensated for airspeed, as shown in block 35. More specifically, the mount of rudder movement necessary to relieve the vertical stabilizer force produced by wind gusts or atmospheric turbulence is a function of airplane airspeed. As airspeed increases for a constant rudder angle, a greater force is exerted by the rudder about the yaw axis of the airplane. Airspeed gain compensation is accomplished by dividing ΔP by impact pressure, $q_c$, whose value is a function of the total air pressure minus the static air pressure of the airplane. In a conventional manner, an air data computer 37 located on board the airplane produces a value for $q_c$ based on data received from the total pressure probe and the static pressure port of the airplane. The end result of the airspeed gain compensation adjustment is a pressure differential coefficient (ΔCp), that is independent of airspeed. Impact pressure is used because it is readily determinable using total pressure probe and static pressure port data which are basic elements of an air data system. Alternatively, the pressure differential coefficient ΔCp could be calculated in a more traditional manner using dynamic pressure, q, which is a function of the air density and the square of true airspeed of the airplane. As is well known to those skilled in the art, impact pressure approximately equals dynamic pressure times 0.25 the square of Math number.

ΔCp is multiplied at block 39 by a factor, β/ΔCp, that is based on the mach speed of the airplane. The value β/ΔCp is nonlinearly related to the mach speed of the airplane, and preferably is stored in a look-up table. See block 40. The value of β/ΔCp is the relationship between the airplane sideslip angle, β, and the measured vertical stabilizer pressure coefficient. The result of the modification 39 produces a value denoted $β_{ΔP}$, which is then roll/yaw rate compensated. A yaw rate compensation value is obtained by multiplying (block 41) the yaw rate value produced by the inertial reference unit of the aircraft by a gain adjustment based on the true airspeed ($V_T$) of the airplane. The gain adjustment is produced by dividing $Lx_{ΔP}$ by $V_T$ where $Lx_{ΔP}$ is the distance along the centerline 14 of the airplane (FIG. 1) from the center of gravity to the location of the differential pressure transducer 31 (FIG. 2). See block 43. A roll rate compensation value is obtained by multiplying (block 45) the roll rate value determined by the inertial reference unit of the airplane by a gain adjustment based on the true airspeed ($V_T$) of the airplane. The gain adjustment is produced by dividing $Lz_{ΔP}$ by $V_T$, where $Lz_{ΔP}$ is the vertical distance between the center of gravity of the airplane and the location of the differential pressure sensor. See block 47. The yaw and roll rate compensation values are subtractively combined. See block 49. The resultant value is subtractively combined with the value of $β_{ΔP}$ to produce an air mass sideslip angle ($β_{airmass}$) value. See block 51.

In order to provide rudder movement in response to relatively high-frequency side loads and attenuate low-frequency inputs, the $β_{airmass}$ value is filtered by a high-pass filter. See block 53. The cutoff frequency of the high-pass filter, $f_c$, is equal to approximately (twenty-five percent (25%) of the Dutch roll frequency of the airplane in radians per second, i.e.; $f_c$ approximately equals $0.25*ω_{Dutch\ roll}$. The filtered $β_{airmass}$ value is subtractively combined with a filtered $β_{inertial}$ value. See summer 55.

The filtered $β_{inertial}$ value is derived from the beta-dot inertial, $\dot{β}_{inertial}$, value produced by a yaw damper module 56, such as a yaw damper module of the type commonly used on current Boeing 757, 767 and 747-400 airplanes. A yaw damper control law that produces data that is functionally equivalent to the data produced by a yaw damper module is included in the primary flight computer of the Boeing 777 airplane. In a conventional manner, the yaw damper command counteracts unwanted yaw oscillation, known as Dutch roll. $\dot{β}_{inertial}$, which is the rate of change of the sideslip angle β, is a common output of a yaw damper function. The $\dot{β}_{inertial}$ value is computed using inertially determined yaw rate, roll rate, lateral acceleration, and bank angle values.

As shown in FIG. 2, the beta-dot inertial value, i.e., the $\dot{β}_{inertial}$ value, is first gain compensated by dividing the $\dot{β}_{inertial}$ by $f_c$, which, as described above, is approximately equal to twenty-five percent (25%) of the Dutch roll frequency of the airplane in radians per second. See block 57. The gain adjusted beta-dot inertial value is low-pass filtered, as shown by block 59. The low-pass filter has an upper cutoff frequency equal to $f_c$, which, as described above, is equal to twenty-five percent (25%) of the Dutch roll frequency. The $β_{inertial}$ low-pass filter corner frequency is aligned with the $β_{airmass}$ high-pass filter corner frequency to provide proper cancellation of $β_{airmass}$ measured during airplane maneuvers.

As noted above, the filtered $β_{inertial}$ value is subtractively combined with the filtered $β_{airmass}$ value, as shown in block 55. The result is a value denoted $β_{Gust}$. The $β_{Gust}$ value is gain adjusted by a steady sideslip static gain value equal to $δ_{RUD}/β$, where $δ_{RUD}$ is degrees of rudder deflection. See block 61. The gain compensated $β_{Gust}$ value is modified by a gain shaping filter. See block 63. The gain shaping filter has a 1.0 value up to $ω_1$ and increases to a 1.7 value at $ω_2$, where $ω_1$ is equal to approximately 2.5 times the Dutch roll frequency of the airplane in radians per second, and $ω_2$ is equal to approximately 4.0 times the Dutch roll frequency of the airplane in radians per second. The net effect of the gain shaping filter is to cancel approximately fifty percent (50%) of the vertical stabilizer load at frequencies between $f_c$ and $ω_1$, and cancel almost the full vertical stabilizer effect (85%) at frequencies above $ω_2$. While shown pictorially in FIG. 2 as linearly varying between 107₁ and $ω_2$, the diagram shown is actually an asymptotic representation of the filter, which has a conventional S shape. The actual filter is a lead-lag filter where $ω_1$ is the 3 db point of the lower or lead portion of the filter and $ω_2$ is the 3 db point of the upper or lag portion of the filter.

Unless switched off by a flow separation monitor 65 described below, the gain shaped filter value is subtractively combined with a yaw damper rudder command obtained by gain adjusting the $\dot{β}_{inertial}$ signal to produce a rudder command. See block 67. The $\dot{β}_{inertial}$ signal is gain adjusted by $K_β$ where $K_β$ is a function of airspeed, and varies with airplane type. On the Boeing 777, $K_β$ varies from 2.9 at low airspeeds down to 0.8 at high airspeeds. Thus, the gain shaped filter value forms a rudder modification command.

The flow separation monitor 65 monitors the ΔCp value and detects oscillating ΔP signals, which denote flow separation. When an oscillating ΔP signal is detected, the gain shaped filter value is prevented from becoming part of the rudder command. Rather, the rudder modification command is reduced to zero. A suitable flow separation monitor is described in U.S. application Ser. No. 08/437,405, titled "Method and Apparatus for Detecting Oscillatory Phenomena Indicative of Airflow Separation" by Arun A. Nadkarni et al. (BOCO-1-8416) now U.S. Pat. No. 5,598,991, filed concurrently herewith, the subject matter of which is incorporated herein by reference.

The rudder modification command can also be used to produce a lateral control command that can be used to cancel the roll axis upset of the airplane in response to wind gusts and turbulence. More specifically, as shown in FIG. 2, the lateral control command is produced by first gain modifying the rudder modification command by $\delta_{LAT}/\delta_{RUD}$ where $\delta_{LAT}$ equals degrees of equivalent wheel movement and $\delta_{RUD}$ equals degrees of rudder movement. See block 71. The gain modified rudder modification command is then filtered by a low-pass wheel activity filter 73, whose cutoff frequency, $\omega_3$, is approximately equal to 4.0 times the Dutch roll frequency of the airplane in radians per second. The lateral control low-pass filter provides sufficient bandwidth to control the airplane roll mode, but attenuates the higher frequencies to reduce control surface activity and avoid coupling with wing structural modes.

As will be readily appreciated from the foregoing description, this invention is an improvement on the method and apparatus for reducing aircraft loads resulting from atmospheric turbulence and gusts, described in the '794 patent. Rather than using filters having a corner frequency, $f_c$, to filter $\beta_{inertial}$ and $\beta_{airmass}$ values that is approximately equal to 1.0 radians per second, the corner frequency, $f_c$, of the filters has been reduced to approximately twenty-five percent (25%) of the Dutch roll frequency. Increasing the bandwidth to include the Dutch roll frequency range improves wind gust and atmosphere turbulence suppression performance by reducing rigid body response to wind gusts and atmospheric turbulence. In effect, the aircraft is prevented from yawing into the wind at frequencies in the Dutch roll region. Operating in the Dutch roll frequency range requires improved balancing between airmass and inertial sideslip, as described below. The wider bandwidth also sustains sideslip due to gusts and turbulence longer, and effectively reduces weathercock stability. Reduced weathercock stability leads to increased roll-off in gusts and turbulence due to airplane dihedral effect. This effect is addressed by the lateral control command, as more fully discussed below.

Improved balancing between airmass and inertial sideslip is provided by correcting the differential pressure signal, $\Delta P$, for yaw rate and roll rate. The correction produces a more precise measure of airmass sideslip angle. Correction for yaw rate and roll rate produces a better balance between airmass sideslip angle and inertial sideslip angle during maneuvers, and thus minimizes spurious surface commands, which can degrade airplane handling qualities. As noted above, the correction for yaw rate and roll rate becomes particularly important when the corner frequency, $f_c$, of the high-pass filter is below the Dutch roll frequency.

The inclusion of the gain shaping filter 63 results in a rudder gain that varies as a function of frequency. The shaping filter increases high frequency gain by seventy percent (70%). The net effect of the gain shaping is to cancel approximately fifty percent (50%) of the vertical stabilizer wind gust and atmospheric turbulence load at frequencies between $f_c$ and $\omega_1$, and cancel almost all of the vertical stabilizer gust load (85%) for frequencies above $\omega_2$. Approximately half the vertical stabilizer load is required at low frequencies to balance the side load due to fuselage lift. At higher frequencies, the fuselage lift-growth time constant is sufficiently slow that essentially all of the vertical stabilizer load may be canceled. The objective is to just balance the yawing moment due to the wing and body of the airplane with the yawing moment due to the vertical stabilizer such that the net yawing moment is zero. Optimum performance is produced by providing a zero yawing moment due to wind gusts and atmospheric turbulence. The shaping filter allows increased gain in the higher frequency range, without over-commanding in the low frequency range. In effect, the airplane is prevented from yawing into the wind in the frequency range between Dutch roll and first body bending. High-pass filtering of the airmass sideslip angle allows the airplane to mm into the wind for frequencies below $f_c$. The nominal frequencies for $\omega_1$ and $\omega_2$ are, as noted above, 2.5 times and 4.0 times the Dutch roll frequency, respectively. Specific frequencies and gain magnitudes for any given airplane will vary somewhat as a function of the wing/body/nacelle and vertical stabilizer configuration.

As noted above, a lateral control gust or turbulence suppression command is obtained by sideslip scaling the rudder modification command. The bandwidth of the lateral control command is limited by $\omega_3$, the cutoff frequency of the wheel activity filter 73, to avoid flexible mode coupling. The lateral control command can form a series input to the lateral control section of a fly-by-wire flight control system or a series input to an aileron servo or an autopilot lateral control servo in a conventional flight control system. The use of a lateral control command having a bandwidth that is approximately equal to 4.0 times the Dutch roll frequency minimizes rigid body roll response without coupling to the flexible body and wing modes of the airplane. The lateral control command improves the handling qualities of the airplane by reducing roll response to wind gust and atmospheric turbulence. The lateral control command is a key part of controlling rigid body turbulence and gust response because the command counters the increased tendency to roll-off (due to dihedral effect) as the weathercock stability of the airplane is artificially reduced. In effect, the airplane is prevented from rolling due to turbulence and gusts at the corner frequency, $f_c$, and above.

As will be readily appreciated from the foregoing description, the invention substantially reduces the aft cabin sideways motion of an airplane when the airplane receives discrete wind gusts or encounters atmospheric turbulence. Reducing aft cabin rigid body displacement improves passenger ride quality and the cabin crew's working environment. Reducing roll and yaw axes response to wind gusts and atmospheric turbulence improves handling qualities and path control and, thus, reduces pilot workload. Rudder and lateral control commands are more effective than conventional systems because vertical stabilizer differential pressure is used to prevent unwanted motion. Rather than attenuating uncommanded motion, the invention prevents discrete wind gusts and atmospheric turbulence from producing upsets.

While a preferred embodiment of the invention has been illustrated and described, it will be appreciated that, within the scope of the appended claims, various changes can be made therein.

The embodiments of the invention in which an exclusive property or privilege is claimed are defined as follows:

1. A method of producing a rudder modification command for reducing unwanted sideways motion in the aft cabin of an airplane comprising:

determining the pressure differential across the opposite sides of the vertical stabilizer of the airplane;

producing an airmass sideslip angle value based on said pressure differential;

roll and yaw compensating said airmass sideslip angle value to produce a compensated airmass sideslip angle value;

high-pass filtering said compensated airmass sideslip angle value with a filter having a corner frequency that is approximately twenty-five percent (25%) of the Dutch roll frequency of the airplane to produce a first rudder deflection value;

deriving a second rudder deflection value by gain adjusting and low-pass filtering an inertially derived sideslip angle rate value with a filter having a corner frequency that is approximately twenty-five percent (25%) of the Dutch roll frequency of the airplane;

subtractively combining said first and second rudder deflection values; and gain shape filtering said combined first and second rudder deflection values to produce a rudder modification command, said gain shape filtering gain modifying said combined first and second rudder deflection values as a function of the Dutch roll frequency of the airplane.

2. The method claimed in claim 1, wherein said rudder deflection value is produced by dividing said differential pressure by an impact pressure variable, $q_c$, whose value is a function of the total air pressure minus the static air pressure of the airplane.

3. The method claimed in claim 2, wherein said rudder deflection value is also compensated by a factor, $\beta/\Delta Cp$, whose value is based on the mach speed of the airplane.

4. The method claimed in claim 3, wherein said roll and yaw compensation of said rudder deflection value comprises:

obtaining a roll rate compensation value by multiplying the roll rate of the airplane by a roll rate gain adjustment based on the true airspeed of the airplane;

obtaining a yaw rate compensation value by multiplying the yaw rate of the airplane by a yaw rate gain adjustment based on the true airspeed of the airplane;

subtractively combining said roll rate compensation value and said yaw rate compensation value to produce a combined roll and yaw rate compensation value; and subtractively combining said combined roll and yaw rate compensation value with said rudder deflection value.

5. The method claimed in claim 4, wherein said yaw rate gain adjustment equals $Lx_{AP}$ divided by $V_T$, where $Lx_{AP}$ is the distance along the centerline of the airplane from the center of gravity of the airplane to the location where said pressure differential is detected and $V_T$ is the true airspeed of the airplane; and wherein said roll rate gain adjustment is equal to $Lz_{AP}$ divided by $V_T$ where $Lz_{AP}$ is the vertical distance between the center of gravity of the airplane and the location where said pressure differential is detected and $V_T$ is the true airspeed of the airplane.

6. The method claimed in claim 5, wherein said combined first and second rudder deflection value is gain adjusted prior to being gain shape filtered.

7. The method claimed in claim 6, wherein said gain adjustment of said combined first and second rudder deflection value is by an mount equal to $\delta_{RUD}/\beta$, where $\delta_{RUD}$ equals degrees of rudder movement and $\beta$ equals the airplane's sideslip angle.

8. The method claimed in claim 7, wherein said gain shape filtering has a gain value of 1.0 at $\omega_1$ and below and a gain value of 1.7 at $\omega_2$ and above and varies between $\omega_1$ and $\omega_2$, where $\omega_1$ is equal to approximately 2.5 times the Dutch roll frequency of the airplane and $\omega_2$ is equal to approximately 4.0 times the Dutch roll frequency of the airplane.

9. The method claimed in claim 8, including producing a lateral control command based on said rudder modification command.

10. The method claimed in claim 9, wherein said rudder modification command is gain adjusted by a factor of $\delta_{LAT}/\delta_{RUD}$ where $\delta_{LAT}$ equals degrees of equivalent wheel movement and $\delta_{RUD}$ equals degrees of rudder movement.

11. The method claimed in claim 10, wherein said lateral control command is obtained by low-pass filtering said rudder modification command, said low-pass filtering having a cutoff frequency of $\omega_3$, where $\omega_3$ is approximately equal to 4.0 times the Dutch roll frequency of the airplane.

12. The method claimed in claim 1, wherein said rudder deflection value is also compensated by a factor, $\beta/\Delta Cp$, whose value is based on the mach speed of the airplane.

13. The method claimed in claim 1, wherein said roll and yaw compensation of said rudder deflection value comprises:

obtaining a roll rate compensation value by multiplying the roll rate of the airplane by a roll rate gain adjustment based on the true airspeed of the airplane;

obtaining a yaw rate compensation value by multiplying the yaw rate of the airplane by a yaw rate gain adjustment based on the true airspeed of the airplane;

subtractively combining said roll rate compensation value and said yaw rate compensation value to produce a combined roll and yaw rate compensation value; and subtractively combining said combined roll and yaw rate compensation value with said rudder deflection value.

14. The method claimed in claim 13, wherein said yaw rate gain adjustment equals $Lx_{AP}$, divided by $V_T$, where $Lx_{AP}$, is the distance along the centerline of the airplane from the center of gravity of the airplane to the location where said pressure differential is detected and $V_T$ is the true airspeed of the airplane; and wherein said roll rate gain adjustment is equal to $Lz_{AP}$ divided by $V_T$ where $Lz_{AP}$ is the vertical distance between the center of gravity of the airplane and the location where said pressure differential is detected and $V_T$ is the true airspeed of the airplane.

15. The method claimed in claim 1, wherein said combined first and second rudder deflection value is gain adjusted prior to being gain shape filtered.

16. The method claimed in claim 15, wherein said gain adjustment of said combined first and second rudder deflection value is by an amount equal to $\delta_{RUD}/\beta$, where $\delta_{RUD}$ equals degrees of rudder movement and $\beta$ equals the airplanes sideslip angle.

17. The method claimed in claim 1, wherein said gain shape filtering has a gain value of 1.0 at $\omega_1$ and below and a gain value of 1.7 at $\omega_2$ and above and varies between $\omega_1$ and $\omega_2$, where $\omega_1$ is equal to approximately 2.5 times the Dutch roll frequency of the airplane and $\omega_2$ is equal to approximately 4.0 times the Dutch roll frequency of the airplane.

18. The method claimed in claim 1, including producing a lateral control command based on said rudder modification command.

19. The method claimed in claim 18, wherein said rudder modification command is gain adjusted by a factor of $\delta_{LAT}/\delta_{RUD}$ where $\delta_{LAT}$ equals degrees of equivalent wheel movement and $\delta_{RUD}$ equals degrees of rudder movement.

20. The method claimed in claim 19, wherein said lateral control command is obtained by low-pass filtering said rudder modification command, said low-pass filtering having a cutoff frequency of $\omega_3$, where $\omega_3$ is approximately equal to 4.0 times the Dutch roll frequency of the airplane.

21. A system for producing a rudder modification command suitable for reducing unwanted sideways motion in the aft cabin of an airplane when applied to the rudder of the airplane, said system comprising:

(a) a pressure differential sensor for measuring the differential pressure across the opposite sides of the vertical stabilizer of an airplane;

(b) a rudder modification command subsystem connected to said pressure differential sensor, said rudder modification command subsystem including:

(1) a divider for dividing pressure differential measurements by an impact pressure variable, $q_c$, to produce a pressure coefficient value;

(2) a scaler for scaling said pressure coefficient value by a factor that converts said pressure coefficient value into an airmass sideslip angle value;

(3) a roll and yaw rate compensator for compensating said airmass sideslip angle value to produce a compensated airmass sideslip angle value;

(4) a high-pass filter for filtering said compensated airmass sideslip angle value and producing a first rudder deflection value, said high-pass filter having a corner frequency that is approximately twenty-five percent (25%) of the Dutch roll frequency of the airplane;

(5) a low-pass filter for filtering an inertially derived sideslip angle rate value and producing a second rudder deflection value, said low-pass filter having a corner frequency that is approximately twenty-five percent (25%) of the Dutch roll frequency of the airplane;

(6) a subtractor for combining said first and second rudder deflection values; and (7) a gain shape filter for filtering said combined first and second rudder deflection values to produce a rudder modification command, said gain shape filter gain modifying said combined first and second rudder deflection values as a function of the Dutch roll frequency of the airplane.

22. The system claimed in claim 21, wherein said rudder modification command subsystem also includes a rudder compensator for compensating said rudder deflection value by a factor, $\beta/\Delta Cp$, whose value is based on the mach speed of the plane.

23. The system claimed in claim 22, wherein said roll and yaw rate compensator includes:

a roll rate multiplier for multiplying the roll rate of the airplane by a roll rate gain adjustment based on the true airspeed of the airplane;

a yaw rate multiplier for multiplying the yaw rate of the airplane by a yaw rate gain adjustment based on the true airspeed of the airplane;

a first subtractor for combining said roll rate compensation value and said yaw rate compensation value to produce a combined roll and yaw rate compensation value; and a second subtractor for combining said combined roll and yaw rate compensation value with said rudder deflection value.

24. The system claimed in claim 23, wherein said yaw rate gain adjustment equals $Lx_{AP}$ divided by $V_T$, where $Lx_{AP}$ is the distance along the centerline of the airplane from the center of gravity of the airplane to the location where said pressure differential is detected and $V_T$ is the true airspeed of the airplane; and wherein said roll rate gain adjustment is equal to $Lz_{AP}$ divided by $V_T$ where $Lz_{AP}$ is the vertical distance between the center of gravity of the airplane and the location where said pressure differential is detected and $V_T$ is the true airspeed of the airplane.

25. The system claimed in claim 24, wherein said rudder modification command subsystem includes a gain adjuster for gain adjusting combined first and second rudder deflection value prior to said combined first and second rudder deflection value being filtered by said gain shape filter.

26. The system claimed in claim 25, wherein said gain adjustment of said combined first and second rudder deflection value is by an mount equal to $\delta_{RUD}/\beta$, where $\beta_{RUD}$ equals degrees of rudder movement and $\beta$ equals the airplane's sideslip angle.

27. The system claimed in claim 26, wherein said gain shape filter has a gain value of 1.0 at $\omega_1$ and below and a gain value Of 1.7 at $\omega_2$ and above and varies between $\omega_1$ and $\omega_2$, where $\omega_1$ is equal to approximately 2.5 times the Dutch roll frequency of the airplane and $\omega_2$ is equal to approximately 4.0 times the Dutch roll frequency of the airplane.

28. The system claimed in claim 27, including lateral control command subsystem for producing a lateral control command based on said rudder modification command.

29. The system claimed in claim 28, wherein said lateral control command subsystem includes a low-pass filter for filtering said rudder modification command, said low-pass filter having a cutoff frequency of $\omega_3$, where $\omega_3$ is approximately equal to 4.0 times the Dutch roll frequency of the airplane.

30. The system claimed in claim 29, wherein said lateral control command subsystem includes a gain adjuster for gain adjusting said rudder modification command by a factor of $\delta_{LAT}/\delta_{RUD}$ where $\delta_{LAT}$ equals degrees of equivalent wheel movement and $\delta_{RUD}$ equals degrees of rudder movement.

31. The system claimed in claim 21, wherein said rudder modification command subsystem also includes a rudder compensation for compensating said rudder deflection value by a factor, $\beta/\Delta Cp$, whose value is based on the mach speed of the plane.

32. The system claimed in claim 21, wherein said roll and yaw rate compensator includes:

a roll rate multiplier for multiplying the roll rate of the airplane by a roll rate gain adjustment based on the true airspeed of the airplane;

a yaw rate multiplier for multiplying the yaw rate of the airplane by a yaw rate gain adjustment based on the true airspeed of the airplane;

a first subtractor for combining said roll rate compensation value and said yaw rate compensation value to produce a combined roll and yaw rate compensation value; and a second subtractor for combining said combined roll and yaw rate compensation value with said rudder deflection value.

33. The system claimed in claim 32, wherein said yaw rate gain adjustment equals $Lx_{AP}$ divided by $V_T$, where $Lx_{AP}$ is the distance along the centerline of the airplane from the center of gravity of the airplane to the location where said pressure differential is detected and $V_T$ is the true airspeed of the airplane; and wherein said roll rate gain adjustment is equal to $Lz_{AP}$ divided by $V_T$ where $Lz_{AP}$ is the vertical distance between the center of gravity of the airplane and the location where said pressure differential is detected and $V_T$ is the true airspeed of the airplane.

34. The system claimed in claim 21, wherein said rudder modification command subsystem includes a gain adjuster for gain adjusting combined first and second rudder deflection value prior to said combined first and second rudder deflection value being filtered by said gain shape filter.

35. The system claimed in claim 34, wherein said gain adjustment of said combined first and second rudder deflection value is by an mount equal to $\delta_{RUD}/\beta$, where $\delta_{RUD}$ equals degrees of rudder movement and $\beta$ equals the airplane's sideslip angle.

36. The system claimed in claim 21, wherein said gain shape filter has a gain value of 1.0 at $\omega_1$ and below and a gain value of 1.7 at $\omega_2$ and above and varies between $\omega_1$ and $\omega_2$, where $\omega_1$ is equal to approximately 2.5 times the Dutch roll frequency of the airplane and $\omega_2$ is equal to approximately 4.0 times the Dutch roll frequency of the airplane.

37. The system claimed in claim 21, including lateral control command subsystem for producing a lateral control command based on said rudder modification command.

38. The system claimed in claim 37, wherein said lateral control command subsystem includes a low-pass filter for filtering said rudder modification command, said low-pass filter having a cutoff frequency of $\omega_3$, where $\omega_3$ is approximately equal to 4.0 times the Dutch roll frequency of the airplane.

39. The system claimed in claim 38, wherein said lateral control command subsystem includes a gain adjuster for gain adjusting said rudder modification command by a factor of $\delta_{LAT}/\delta_{RUD}$ where $\delta_{LAT}$ equals degrees of equivalent wheel movement and $\delta_{RUD}$ equals degrees of rudder movement.

* * * * *

UNITED STATES PATENT AND TRADEMARK OFFICE
CERTIFICATE OF CORRECTION

PATENT NO. : 5,669,582
DATED : September 23, 1997
INVENTOR(S) : W.F. Bryant et al.

It is certified that error appears in the above-identified patent and that said Letters Patent is hereby corrected as shown below:

| COLUMN | LINE | |
|---|---|---|
| 9 (Claim 7, | 55 line 3) | "an mount" should read --an amount-- |
| 10 (Claim 14, | 28 line 2) | After "Lx$_\Delta$P" delete "," |
| 10 (Claim 14, | 29 line 3) | After "Lx$_\Delta$P" delete "," |
| 10 (Claim 16, | 44 line 5) | "airplanes" should read --airplane's-- |
| 12 (Claim 26, | 6 line 3) | "an mount" should read --an amount-- |
| 12 (Claim 27, | 11 line 3) | "Of 1.7" should read --of 1.7-- |

UNITED STATES PATENT AND TRADEMARK OFFICE
CERTIFICATE OF CORRECTION

PATENT NO. : 5,669,582
DATED : September 23, 1997
INVENTOR(S) : W.F. Bryant et al.

It is certified that error appears in the above-identified patent and that said Letters Patent is hereby corrected as shown below:

COLUMN    LINE

12    65    "an mount" should read --an amount--
(Claim 35,  line 3)

Signed and Sealed this

Seventeenth Day of February, 1998

Attest:

BRUCE LEHMAN

*Attesting Officer*    *Commissioner of Patents and Trademarks*